S. NICOLA.
AUTOMOBILE LOCK.
APPLICATION FILED MAY 19, 1917.
1,238,557. Patented Aug. 28, 1917.
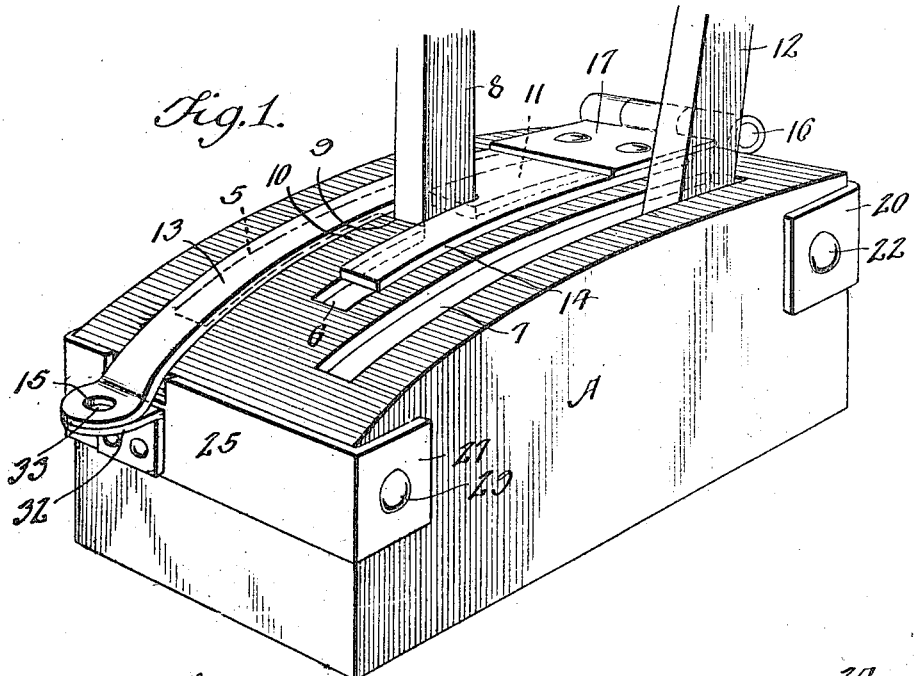
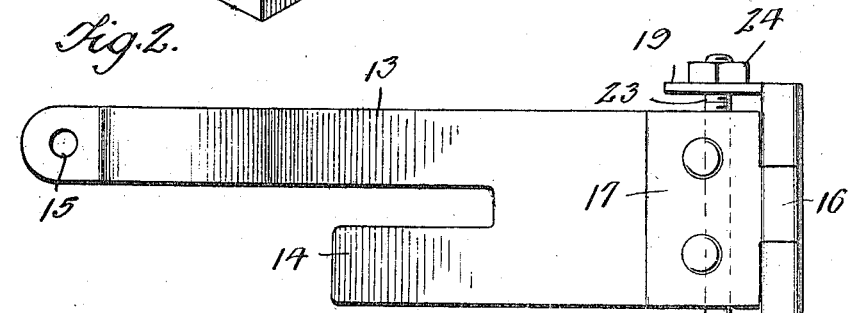
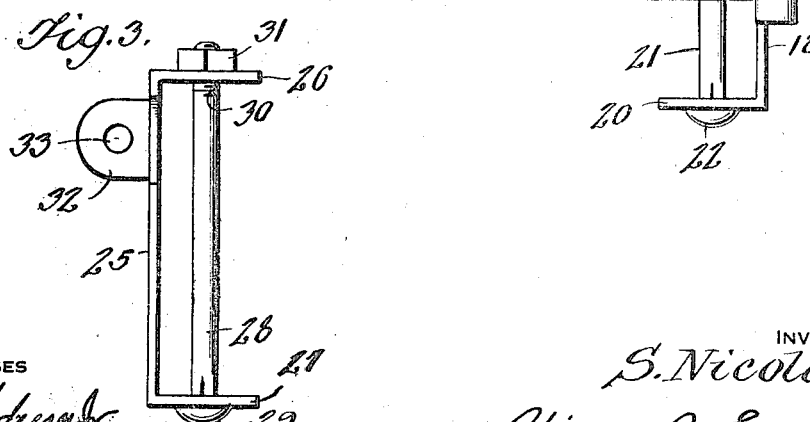
WITNESSES
INVENTOR
S. Nicola,
BY Victor J. Evans
ATTORNEY

UNITED STATES PATENT OFFICE.

SAVA NICOLA, OF MADISON, ILLINOIS.

AUTOMOBILE-LOCK.

1,238,557.  Specification of Letters Patent.  Patented Aug. 28, 1917.

Application filed May 19, 1917. Serial No. 169,750.

*To all whom it may concern:*

Be it known that I, SAVA NICOLA, a subject of the King of Bulgaria, residing at Madison, in the county of Madison and State of Illinois, have invented new and useful Improvements in Automobile-Locks, of which the following is a specification.

This invention is an automobile lock more particularly adapted for use in connection with the quadrant for the gear shift lever and the emergency shift lever.

One object of the invention is to provide a lock that will effectively prevent an unauthorized person from shifting the gears and the emergency brake when applied.

Another object is to provide a lock that consists of few parts, simple and strong in construction, reliable and effective in operation, and one that is cheap to manufacture.

The invention broadly stated, comprises a hasp provided with fingers of unequal lengths, and having a hinged connection with an angular member, said angular member being provided with holes so that it may be attached securely to the quadrant box, and a staple or keeper secured to another angular member that may be rigidly attached to the opposite end of the quadrant box, one of the fingers being provided with a hole to coöperate with the hole in the staple and through which may be passed suitable locking means, so that the finger and staple may not be separated, the spacing between the fingers also providing a slot in which may be disposed the gear shift lever when in a neutral position.

One practical form of the invention will be described and illustrated in the accompanying drawing, in which:—

Figure 1 is a perspective view of the quadrant with the lock applied;

Fig. 2 is a top plan view of the body portion of the lock; and

Fig. 3 is a top plan view of the staple or keeper end.

In the preferred embodiment shown, the quadrant box A may be of the usual type and construction as employed upon self-propelled vehicles. As shown, this quadrant box is of substantially rectangular outline and is provided with a rounded top in which are formed suitable slots, indicated at 5, 6, and 7.

The slots 5 and 6 serve to permit the gear shift lever 8 to pass throughout their length in order to shift the gears of the transmission. Between the slots 5 and 6 there is another slot indicated at 9, which forms a neutral position for the gears when the lever 8 is positioned therein.

As shown the quadrant box will have the fingers 10 and 11 formed between the slots 5 and 6, and thus it will produce a top which is approximately H-shaped. The slot 7 is provided for the brake lever, indicated at 12.

To coöperate with the gear shift lever 8 to lock it in a neutral position, the hinged hasp is provided. The body portion of the hasp is provided with two curved fingers indicated at 13 and 14. The finger 13 is provided at its outer end with a hole indicated at 15. The hinged connection for the two fingers is indicated at 16.

The two fingers are drawn together by a straight piece of material indicated at 17. The hinged connection 16 connects with the U-shaped member having the horizontal portion indicated at 18, and the legs 19 and 20. The legs 19 and 20 are provided with suitable holes through which passes a bolt having the body portion indicated at 21, a head 22, a threaded portion 23, and a nut therefor indicated at 24.

The body portion 21 of the bolt is adapted to pass through from side to side of the quadrant box A in such a manner that the body portion of the hasp which is hinged thereto may be placed in an operative position with reference to the gear shift lever 8, so as to lock the same in its neutral position.

Adapted to be secured to the opposite end of the quadrant box A is a U-shaped member having the body portion indicated at 25 and the legs 26 and 27. These legs 26 and 27 are provided with suitable holes through which passes a bolt having the body portion indicated at 28, the head 29, the threaded end 30, and the nut for said threads 31. The body portion of this bolt 28 is adapted to pass through the end of the quadrant box A so as to hold the U-shaped member in its proper place thereon.

Extending at right angles from the horizontal portion 25 of the U-shaped member is a staple or other suitable device, the body portion of which is indicated at 32, and in which is formed the hole 33. The hole 33 is adapted to be positioned in alinement with the hole 15 formed in the finger 13, when the finger 13 is moved by means of its hinged connection 16 to a lowered position. The holes 15 and 33 are for the purpose of permitting any suitable locking device to be passed therethrough, so that the finger 13 of the hasp may be securely retained in a locking position, so that the lever 8 of the transmission may not be moved, thus preventing the shifting of the gears when the owner leaves the machine.

Minor changes in the form, proportions, and details of construction may be resorted to without departing from the spirit of the invention or the scope of the appended claim.

What is claimed as new is:—

An automobile lock comprising a curved body portion having a hinged joint, means to secure one part of the body portion to the quadrant box for gear shift lever and emergency brake, said body portion being provided with fingers of different lengths to cover the slots in the quadrant box when the gear shift lever is in the neutral position, the longer one of said fingers being provided with a bent end angularly disposed having a hole therein, a U-shaped member adapted to be secured to the other end of the quadrant box which member is provided with an angularly disposed L-shaped element having a hole formed therein capable of registering with the hole in the longer finger when in a closed or locking position, and means to retain said finger and L-shaped element in operative relation to prevent unauthorized movements of the gear shift lever.

In testimony whereof I affix my signature.

SAVA NICOLA.